United States Patent [19]

Newman et al.

[11] Patent Number: 4,861,076
[45] Date of Patent: Aug. 29, 1989

[54] GASKET FOR SANITARY PIPE FITTINGS

[75] Inventors: David W. Newman, Lebanon; George Y. Lin, Kettering, both of Ohio

[73] Assignee: Newman Sanitary Gasket Company, Lebanon, Ohio

[21] Appl. No.: 181,399

[22] Filed: Apr. 13, 1988

[51] Int. Cl.[4] ............................................. F16L 19/02
[52] U.S. Cl. .................................. 285/332.3; 285/354
[58] Field of Search ...................... 285/354, 355, 332.3; 277/227

[56] References Cited

U.S. PATENT DOCUMENTS

| 2,780,483 | 2/1957 | Kessler | 285/354 X |
|---|---|---|---|
| 2,790,661 | 4/1957 | Tamminga | 285/354 X |
| 2,985,470 | 5/1961 | Hirsch . | |
| 3,124,502 | 3/1964 | Radke | 285/910 X |
| 3,345,942 | 10/1967 | Meltz . | |
| 3,645,958 | 2/1972 | Palumbo . | |
| 3,769,370 | 10/1973 | Martin et al. . | |
| 3,865,764 | 2/1975 | Drelich et al. . | |
| 3,865,765 | 2/1975 | Drelich et al. . | |
| 3,865,775 | 2/1975 | Drelich et al. . | |
| 3,873,106 | 3/1975 | Pastelak . | |
| 3,879,044 | 4/1975 | Estes . | |
| 3,888,810 | 6/1975 | Shinomura . | |
| 3,930,074 | 12/1975 | Drelich et al. . | |
| 3,931,085 | 1/1976 | Drelich et al. . | |
| 3,943,079 | 3/1976 | Hamed . | |
| 3,968,316 | 7/1976 | Jyo et al. . | |
| 3,976,627 | 8/1976 | Morris . | |
| 4,053,166 | 10/1977 | Domkowski . | |
| 4,131,584 | 12/1978 | Burke et al. . | |
| 4,214,761 | 7/1980 | Pippert . | |
| 4,217,255 | 8/1980 | Griffith . | |
| 4,226,911 | 10/1980 | Haren . | |
| 4,250,064 | 2/1981 | Chandler . | |
| 4,258,917 | 3/1981 | Murphy . | |
| 4,263,184 | 4/1981 | Leo et al. . | |
| 4,289,668 | 9/1981 | Li . | |
| 4,289,676 | 9/1981 | Czauderna et al. . | |
| 4,323,625 | 4/1982 | Coran et al. . | |
| 4,328,133 | 5/1982 | Ogawa et al. . | |
| 4,330,017 | 5/1982 | Satoh et al. . | |
| 4,389,361 | 6/1983 | Messerly . | |
| 4,393,154 | 7/1983 | Tyler et al. . | |
| 4,426,090 | 1/1984 | Bender . | |
| 4,431,704 | 2/1984 | Springer . | |
| 4,545,927 | 10/1985 | Railsback . | |
| 4,560,718 | 12/1985 | Ritchey | 285/910 X |
| 4,563,488 | 1/1986 | Minami et al. . | |
| 4,596,839 | 6/1986 | Peters . | |
| 4,652,528 | 3/1987 | Domkowski . | |
| 4,711,474 | 12/1987 | Patrick | 285/355 X |

OTHER PUBLICATIONS

"Rubber Compounding", *Encyclopedia of Chemical Technology*, vol. 20, John Wiley & Sons, p. 386.

Primary Examiner—Thomas F. Callaghan
Attorney, Agent, or Firm—Wood, Herron & Evans

[57] ABSTRACT

A sanitary pipe fitting and improved gasket for use in such fitting wherein the pipe fitting comprises first and second pipes, a gasket, and a nut for securing the ends of the pipes in an assembled relation with the gasket sandwiched therebetween. The pipes each terminate in an end face which has a conical surface and a radial shoulder, the shoulder of one pipe being located on the inside of the pipe and the shoulder of the other pipe being on the outside of the pipe. The gasket is annular and has end faces complementary in shape to the end faces of the pipes. According to the practice of this invention, the gasket is molded from a fiber-reinforced elastomeric material.

8 Claims, 1 Drawing Sheet

GASKET FOR SANITARY PIPE FITTINGS

This invention relates to improvements in sanitary pipe fittings, and more particularly, to an improved gasket for use in such pipe fittings.

Sanitary pipe fittings are commonly used in dairies or other branches of the food industry for sealing connections of pipes, which connections are required to be opened and cleaned regularly and quite commonly on a daily basis In many food processing plants, as for example, dairies, the requirement for sanitary conditions is very strict, one such requirement being that the piping be taken apart daily and cleaned. To that end, the lines must be quickly detachable and removable, and wherever possible, free from voids and crevices to prevent accumulations of foods and cleaning solutions. To facilitate such regular cleaning, it has been proposed to entirely omit gaskets between the pipes of the fitting, but that results in a gasket joint which does not form a continuous inner surface, but gives rise to a recess at the point of connection of the two pipes, which recess tends to collect milk or food flowing through the pipes.

A better solution and one which has been generally adopted by the food processing industry is to utilize specially shaped gaskets which present a continuous flow surface in the joint between adjacent ends of connected pipes of the pipe joint. Such gaskets of varying shapes have been made from elastomeric, as well as non-elastomeric, synthetic, plastic materials. One such gasket which has met with relatively wide commercial acceptance is disclosed in U.S. Pat. No. 2,985,470. According to the disclosure of this patent, the gasket is machined from polymeric tetrafluoromethane to form a gasket with pair of parallel, conical surfaces and with cylindrical inner and outer surfaces. The obtuse corners of the resulting polygrammatic cross section are chamfered to form radially extending shoulders on the gasket. These shoulders, along with the intersecting, conical surfaces of the gasket, form large seating surfaces with the complementary shaped ends of the pipes of the pipe fitting.

The difficulty or shortcoming of the above-described gasket resides in the fact that it is objectionably deformed when clamped between opposed ends of the pipes of a pipe fitting. That deformation inevitably results in destruction of the gasket after several uses.

Other configurations of gaskets have been manufactured from elastomeric materials, but those elastomeric gaskets have also resulted in a very short useful life, i.e., they failed to seal the fitting after several uses or instances of being assembled and disassembled with a fitting.

It has therefore been an objective of this invention to provide an improved seal for a sanitary pipe fitting which has a much longer life than prior art seals, including the prior art seal disclosed in the above-identified U.S. Pat. No. 2,985,470.

Another objective of this invention has been to provide a gasket which forms a better seal in a sanitary pipe fitting and one which is more easily and properly seated in the fitting than prior art gaskets when used in the same fitting.

The gasket of this invention which accomplishes these objectives is a beveled seat gasket which is used in combination with a pipe fitting or pipe union. The pipe fitting comprises a first pipe terminating in a head with male threads and a second pipe terminating in an outer annular flange, which head and flange present confronting annular faces of generally conical configuration with chamfers or shoulders at the extreme ends of the pipes. A nut having an internal flange engages the flange of one pipe and is threaded over male threads on the head of the opposite pipe. The deformable gasket of this invention is inserted within the nut between the opposed faces on the ends of the pipe. This gasket has an inner annular, cylindrical surface of the same diameter as the inside diameter of the pipes, and an outer annular, cylindrical surface of substantially the same diameter as the root diameter of the male threads on the head of the non-flanged pipe. The gasket has end faces substantially complementary to the confronting annular faces of the pipe such that radial shoulders of the gasket lie flat against corresponding shoulders of the ends or faces of the pipe, and conical surfaces of the gasket fit against complementary shaped surfaces on the faces or ends of the pipes. The inner and outer shoulders of the gasket are located in substantially offset radial planes in contrast to the gasket of the above-identified patent wherein the shoulders are located in substantially the same or a common radial plane. Because of this offset, the gasket may be molded from a fiber-reinforced elastomeric material in a mold wherein the parting plane of the mold and the resulting flash on the gasket is located in a plane parallel to, but located between, the planes of the radial shoulders. Because of this location of the parting line, there is no tendency for the molded gasket to chip during cryogenic removal of the flash which results from the molded forming of the gasket.

Further, it has been found that these gaskets can be formed from elastomeric material having a requisite compression set, tensile strength and hardness. This material when used in a gasket having this defined shape provides several very significant advantages.

The primary advantage of the invention of this application is the much longer life or many more uses of the gasket which may be made as compared relative to a gasket made in accordance with the above-identified patent or any other prior art gasket. Specifically, it has been found that a gasket made in accordance with the invention of this application may result in five or six times as many uses or placements and removals from a pipe fitting assembly than a gasket made in accordance with the disclosure of the above-identified patent or of any other commercially available sanitary pipe fitting gasket.

These and other objects and advantages of this invention will be more readily apparent from the following description of the drawings in which.

Figure 1:
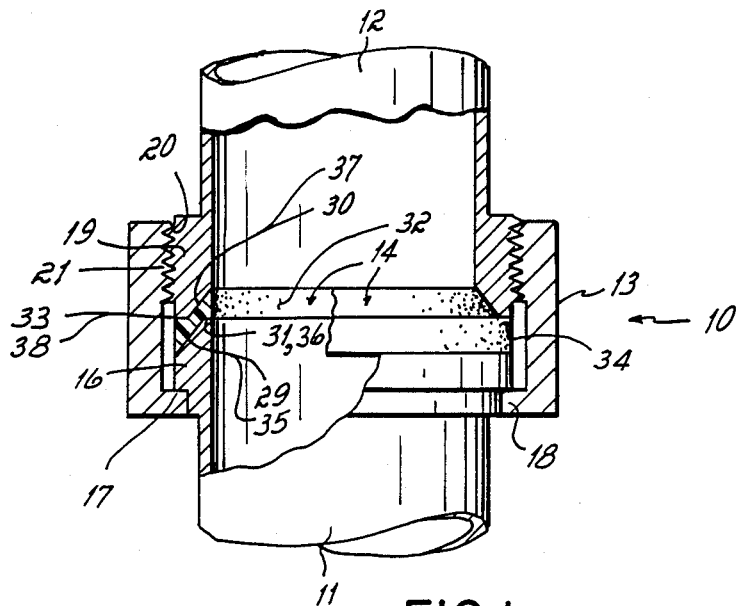
FIG. 1 is a cross-sectional view through a pipe fitting embodying the invention of this application.
Figure 2:
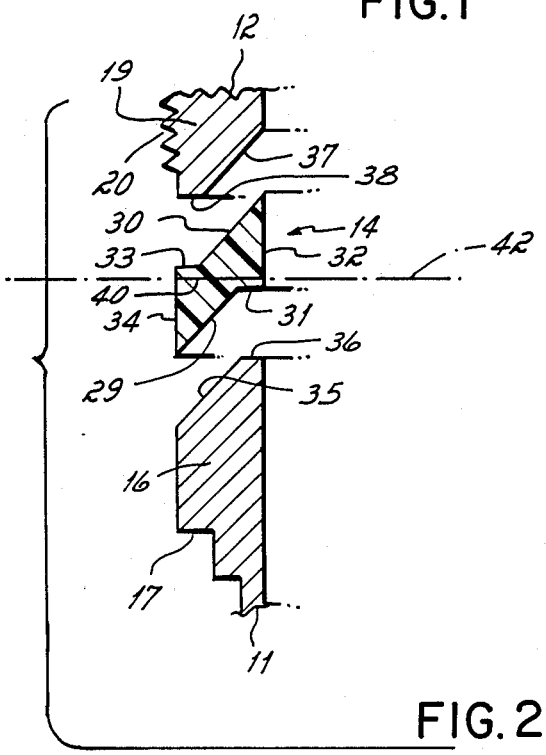
FIG. 2 is an exploded cross-sectional view through a portion o the pipe fitting of FIG. 1.

The pipe fitting or pipe union 10 comprises a lower pipe 11, an upper pipe 12, a nut 13, and an elastomeric gasket 14. The lower pipe 11 has a collar 16 terminating at its upper end in an external annular flange 17 which engages the internal flange 18 of nut 13. The upper pipe 12 has a head 19 whose upper part is externally threaded as indicated at 20, its threads meshing with internal threads 21 in the nut 13 to hold the assembly of members 11, 12, 13 and 14 in an assembled position as illustrated in FIG. 1.

The gasket 14 has an inner annular, conical surface 29, an outer conical surface 30, an inner radial shoulder 31 located between the internal bore 32 of the gasket and the conical surface 29, and an outer radial shoulder 33 located between the outer peripheral cylindrical surface 34 and the conical surface 30. As may be seen in FIG. 1, the conical inner surface 29 and radial shoulder 31 of the gasket are complementary in shape to the conical projection surface 35 and radial shoulder 36 of the lower pipe 11 such that when the gasket and pipes are assembled, the face surfaces 35 and 36 of the lower pipe are flush with the inner conical surface 29 and inner radial shoulder 31, respectively, of the gasket. Similarly, the outer radial shoulder 33 and outer conical surface 30 of the gasket are complementary in shape and angulation to the outer radial shoulder 38 and conical recess surface 37 of the upper pipe 12 such that when the fitting is assembled, the face surfaces 37 and 38 mate and are flush with the surfaces 30 and 33 of the gasket, respectively. It will be noted in the drawings that the inside or bore cylindrical diameter of the gasket 14 is identical to the common inside diameter of the pipes 11 and 12. The outside diameter of the cylindrical peripheral surface 34 of the gasket is identical to the root diameter of the male threads of the upper pipe 12 such that the mating threads of the nut may easily slide over the outer peripheral surface of the gasket to be engaged with the male threads of the upper pipe so as to secure the pipes in an assembled relationship with the gasket sandwiched between the terminal ends or end faces of the pipes. The degree to which the nut is tightened determines the compression of the elastomeric gasket.

In accordance with the practice of this invention, the gasket 14 is molded from a fiber-reinforced elastomeric material. The composition of the material is selected such that the resulting gasket has a very low compression set, i.e., less than 30 percent (so that the gasket will not be excessively deformed after repeated uses and assemblies and disassemblies of the pipe fitting 10), high tensile strength (so that the gasket will not cut or will better resist cutting by the sharp faces of the pipes) and low water absorption, i.e., less than 5 percent. According to the practice of this invention, the fiber-reinforced elastomeric material is either injection or compression molded in order to create the desired configuration of the gasket 14. The choice of whether the gasket is injection or compression molded is a function of the size of the gasket. Irrespective of whether the gasket is injection or compression molded, the molds are closed on a parting line 40 which extends through a plane 42 which is parallel to the planes of the radial shoulders 31 and 32 and is located between the radial planes of the shoulders 31 and 32. This placement of the parting line is very important to the practice of this invention because the flash (not shown) at parting line 40 is removed from the gasket by cryogenic shot blasting. This placement of the parting line 40 of the gasket avoids any tendency for the flash edge to chip the gasket during the cryogenic flash removal.

The chemical composition used to form gasket 14 should be formulated from materials that appear on the Food and Drug Administration White List, listed currently at 21 C.F.R. §177.2600. The gasket is formed from an elastomeric material. There is a very wide range of elastomeric materials suitable for use in the present invention, including fluorocarbon elastomers, butadiene acrylonitrile elastomers, ethylene propylene diene monomer rubbers, styrene butadiene copolymer and silicon rubbers.

These gasket formulations will include a variety of different components, including fillers such as carbon black, silica and clay, to increase their strength and fiber reinforcement, such as nylon fiber and cotton floc, as well as plasticizers, antioxidants, internal and external lubricants, and a cure package.

The formulation of the particular rubber must be such that it meets a series of end use requirements. The elastomeric composition must have a compression set of less than about 30 percent. Due to the cross-sectional configuration of the present gasket, as well as the fact that it is desired for repeated uses, compression set is absolutely critical. If the compression set is higher than this, the gasket would be unsuitable for repeated uses. Compression set is established by effectively crosslinking the elastomer composition.

The gasket also must have sufficient hardness to permit its repeated use. Basically, the gasket material must be from about 85 to about 95 durometer (Shore A). If it is less than this, it will be too soft to obtain the desired compression strength. The hardness of an elastomer is typically increased by increasing the reinforcing filler content, typically carbon black and clay in these applications. The preferred hardness is about 90 durometer (Shore A).

The final requirement for the gasket material for use in the present invention is tensile strength. The tensile strength of the material used in the present invention must be greater than about 800 psi. Typically, the tensile strength can be increased up to about 3,000 psi, but again, the compression set can be negatively effected. Accordingly, the preferred tensile strength is at about 1,200 psi.

One preferred composition from which the gasket 14 may be injection molded according to the practice of the invention is as follows:

|  | PHR |
| --- | --- |
| Butadiene Acrylonitrile Copolymer (Medium High Acrylonitrile) | 75.0 |
| Styrene Butadiene Copolymer (23.5% Styrene) | 25.0 |
| Carbon Black N550 (ASTM, FEF) | 27.0 |
| SBR Resin (82.5% Styrene) | 10.0 |
| Aluminum Silicate (0.2 Micron) | 25.0 |
| Silica (Granular) | 10.0 |
| Aluminum Silicate (2.0 Micron) | 30.0 |
| Talc | 45.0 |
| L.M.W. Polymeric Plasticizer | 3.0–10.0 |
| Zinc Oxide | 7.0 |
| Stearic Acid | 1.0 |
| Cotton Floc | 4.0–10.0 |
| Sulfur | 1.5 |
| 2-Mercaptobenzothiazl Disulfide | 2.0 |
| Tetramethyl Monosulfide | 2.0 |
| Phthalic Anhydride (Retarder) | 2.0 |

This material has a hardness of 90 durometer. If the gasket 14 is to be compression molded, the preferred composition is altered slightly. For compression molding, a preferred composition is as follows:

|  | PHR |
| --- | --- |
| Butadiene-Acrylonitrile Copolymer | 100.0 |
| Carbon Black N550 | 27.0 |
| Silica (Powder) | 45.0 |

| -continued | |
|---|---|
| | PHR |
| Aluminum Silicate | 60.0 |
| Silica (Granular) | 30.0 |
| Dioctyl Phthalate | 5.0–10.0 |
| Polyethylene Powder | 2.0–5.0 |
| Zinc Oxide | 5.0–7.0 |
| Stearic Acid | 1.0 |
| Cotton Floc | 1.0–10.0 |
| Sulfur | 1.5 to 2.0 |
| 2-Mercaptobenzothiazl Disulfide | 2.0 |
| Tetramethylthiuram Monosulfide | 1.5 |

After being either injection or compression molded, the gasket 14 is, subsequent to removal from the mold, shot blasted in a conventional cryogenic deflasher. In accordance with the preferred practice of this invention, after being shot blasted, the gaskets 14 are preferably postcured in a tumbling oven. This subsequent postcure has been found to appreciably reduce the compression set of the resulting gasket and to enable the molding cycle time to be reduced to achieve this desirable compression set.

While I have described only two preferred compositions for the practice of my invention and only one physical embodiment thereof, persons skilled in the art to which this invention pertains will appreciate changes and modifications which may be made without departing from the spirit of my invention. Therefore, I do not intend to be limited except by the scope of the following claims

I claim:

1. A pipe union for a sanitary fitment, which pipe union comprises a first pipe terminating in a head with male threads, a second pipe terminating in an outer annular flange, said head and said flanges being provided with confronting annular faces of generally conical configuration and with like inside diameters, one of said faces having a radial-plane, outer annular shoulder and a conical recess adjoining said outer shoulder, the other of said faces having a radial-plane, inner annular shoulder and a conical projection adjoining said inner shoulder, a nut having an internal flange traversed by said second pipe and engaging said outer flange, said nut being provided with female threads engaging said male threads, said gasket comprising an annular deformable ring adapted to be inserted within said nut between said faces, said gasket being of generally parallelogram cross section and having an inner annular surface of the same diameter as the inside diameters of said pipes, said gasket having an outer annular cylindrical surface, said gasket having end faces substantially complementary to said confronting annular faces of said pipes, said gasket end faces having an inner radial shoulder and an outer radial shoulder, said shoulders of said gasket being adapted to lie flat against the corresponding shoulders of said faces of said pipes, said gasket faces having substantially parallel inner and outer conical surfaces, said inner conical surface extending between said inner radial shoulder and said outer annular cylindrical surface of said gasket and being adapted to rest against said conical projection, said outer conical surface of said gasket extending between said outer radial shoulder and said inner annular cylindrical surface of said gasket, and said gasket comprising a cured elastomeric material having a compression set of less than about 30 percent, a hardness of 85–95 durometer and a tensile strength greater than about 800 psi.

2. The pipe union of claim 1 wherein said elastomer is selected from the group consisting of butadiene acrylonitrile rubber, styrene butadiene copolymer, fluorocarbon elastomer, EPDM and silicone elastomer.

3. The pipe union claimed in claim 2 wherein the shoulders of said gasket are adapted to lie flat against the corresponding shoulders of the faces of said pipes in substantially offset radial planes, the radial shoulders of the gasket being of the same radial depth.

4. A bevel seat gasket for use in a pipe union, which pipe union comprises a first pipe terminating in a head with male threads, a second pipe terminating in an outer annular flange, said head and said flange being provided with confronting annular faces of generally conical configuration and with like inside diameters, one of said faces having a radial-plane, outer annular shoulder and a conical recess adjoining said outer shoulder, the other of said faces having a radial-plane, inner annular shoulder and a conical projection adjoining said inner shoulder a nut having an internal flange traversed by said second pipe and engaging said outer flange, said nut being provided with female threads engaging said male threads, said gasket comprising a molded annular deformable ring adapted to be inserted within said nut between said faces, said gasket being of generally parallelogram cross section and having an inner annular cylindrical surface of the same diameter as the inside diameters of said pipes, said gasket having an outer annular cylindrical surface of substantially the same diameter as the root diameter of said male threads, said gasket having end faces substantially complementary to said confronting annular faces of said pipes, said gasket end faces having an inner radial shoulder and an outer radial shoulder, said shoulders of said gasket being adapted to lie flat against the corresponding shoulders of said faces of said pipes in substantially offset radial planes, the radial shoulders of said gasket being of substantially the same radial depth, said gasket faces having substantially parallel inner and outer conical surfaces, said inner conical surface extending between said inner radial shoulder and said outer annular cylindrical surface of said gasket and being adapted to rest against said conical projection, said outer conical surface of said gasket extending between said outer radial shoulder and said inner annular cylindrical surface of said gasket, said gasket comprising fiber-reinforced elastomeric material, and said gasket having a planar radial mold parting line located in a plane between the radial planes of said radial shoulders of said gasket such that flash created during the molding of said gasket may be removed in a cryogenic deflasher without chipping said gasket during flash removal.

5. A bevel seat gasket for use inn a pipe union, which pipe union comprises a first pipe terminating in a head with male threads, a second pipe terminating in an outer annular flange, said head and said flange being provided with confronting annular faces of generally conical configuration and with like inside diameters, one of said faces having a radial-plane, outer annular shoulder and a conical recess adjoining said outer shoulder, the other of said faces having a radial-plane, inner annular shoulder and a conical projection adjoining said inner shoulder, a nut having an internal flange traversed by said second pipe and engaging said outer flange, said nut being provided with female threads engaging said male threads, said gasket comprising a molded annular deformable ring adapted to be inserted within said nut between said faces, said gasket being of generally parallelogram cross section and having an inner annular cylindrical surface of the same diameter as the inside diameters of said pipes, said gasket having an outer annular cylindrical surface of substantially the same diameter as the root diameter of said male threads, said gasket having end faces substantially complementary to said confronting annular faces of said pipes, said gasket end faces having an inner radial shoulder and an outer radial shoulder, said shoulders of said gasket being adapted to lie flat against the corresponding shoulders of said faces of said pipes in substantially offset radial planes, the radial shoulders of said gasket being of substantially the same radial depth, said gasket faces having substantially parallel inner and outer conical surfaces, said inner conical surface extending between said inner radial shoulder and said outer annular cylindrical surface of said gasket and being adapted to rest against said conical projection, said outer conical surface of said gasket extending between said outer radial shoulder and said inner annular cylindrical surface of said gasket, said gasket comprising fiber-reinforced elastomeric material, and said fiber-reinforced elastomer having a compression set less than about 30 percent, a hardness from about 85 to about 95 durometer, and a tensile strength greater than about 800 psi.

6. A bevel seat gasket for use in a pipe fitting, said gasket comprising a molded annular deformable ring of generally parallelogram cross section, said ring having an inner annular cylindrical surface and an outer annular cylindrical surface, said gasket having opposed end faces, one of said opposed end faces having an inner radial shoulder and the other end face having an outer radial shoulder, said shoulders of said gasket being located in substantially offset radial planes, the radial shoulders of said gasket being of substantially the same radial depth, said opposed gasket end faces having substantially parallel inner and outer conical surfaces, said inner conical surface extending between said inner radial shoulder and said outer annular cylindrical surface of said gasket, said outer conical surface of said gasket extending between said outer radial shoulder and said inner annular cylindrical surface of said gasket, said gasket being molded from a fiber-reinforced elastomeric material, and said gasket having a planar radial mold parting line located in a plane between the radial planes of said radial shoulders of said gasket such that flash created during the molding of said gasket may be removed in a cryogenic deflasher without chipping said gasket during flash removal.

7. In combination, a pipe union and a bevel seat gasket for use in said pipe union, which pipe union comprising a first pipe terminating in a head with male threads, a second pipe terminating in an outer annular flange, said head and said flange being provided with confronting annular faces of generally conical configuration and with like inside diameters, one of said faces having a radial-plane, outer annular shoulder and a conical recess adjoining said outer shoulder, the other of said faces having a radial-plane, inner annular shoulder and a conical projection adjoining said inner shoulder, a nut having an internal flange traversed by said second pipe and engaging said outer flange, said nut being provided with female threads engaging said male threads, said gasket comprising an annular deformable ring inserted within said nut between said faces, said gasket being of generally parallelogram cross section and having an inner annular cylindrical surface of the same diameter as the inside diameters of said pipes, said gasket having an outer annular cylindrical surface of substantially the same diameter as the root diameter of said male threads, said gasket having end faces substantially complementary to said confronting annular faces of said pipes, said gasket end faces having an inner radial shoulder and an outer radial shoulder, said shoulders of said gasket lying flat against the corresponding shoulders of said faces of said pipes in substantially offset radial planes, the radial shoulders of said gasket being of substantially the same radial depth, said gasket faces having substantially parallel inner and outer conical surfaces, said inner conical surface extending between said inner radial shoulder and said outer annular cylindrical surface of said gasket and resting against said conical projection, said outer conical surface of said gasket extending between said outer radial shoulder and said inner annular cylindrical surface of said gasket and resting against said conical recess, and said gasket being molded from a fiber-reinforced elastomeric material, said material being selected from the group consisting of acrylonitrile butadiene elastomer, EPDM, fluorocarbon elastomer and silicon rubber, said material having a compression set less than 30 percent, hardness from about 85 to 95 durometer (Shore A), and a tensile strength greater than 800 psi.

8. The combination of claim 7 wherein said gasket has a planar radial mold parting line located in a plane between the radial planes of said radial shoulders of said gasket.

* * * * *